(12) United States Patent
Nguyen et al.

(10) Patent No.: US 11,835,146 B2
(45) Date of Patent: Dec. 5, 2023

(54) SYMMETRIC FLOW VALVE FOR FLOW CONDUCTANCE CONTROL

(71) Applicant: Applied Materials, Inc., Santa Clara, CA (US)

(72) Inventors: Andrew Nguyen, San Jose, CA (US); Yogananda Sarode Vishwanath, Bangalore (IN); Xue Chang, San Jose, CA (US); Anilkumar Rayaroth, San Jose, CA (US); Chetan Naik, Bangalore (IN); Balachandra Jatak Narayan, Bangalore (IN)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 17/539,372

(22) Filed: Dec. 1, 2021

(65) Prior Publication Data

US 2022/0090686 A1  Mar. 24, 2022

Related U.S. Application Data

(63) Continuation of application No. 16/542,798, filed on Aug. 16, 2019, now Pat. No. 11,199,267.

(51) Int. Cl.
*F16K 11/22* (2006.01)
*F16K 1/42* (2006.01)
(Continued)

(52) U.S. Cl.
CPC .................. *F16K 1/42* (2013.01); *F16K 1/36* (2013.01); *F16K 11/22* (2013.01); *F16K 51/02* (2013.01); *Y10T 137/87877* (2015.04)

(58) Field of Classification Search
CPC .......... H01J 37/32449; H01J 37/32834; F16K 11/20; F16K 11/22; F16K 51/02;
(Continued)

(56) References Cited

U.S. PATENT DOCUMENTS 3,219,063 A    11/1965  Schumann et al.
3,625,474 A *  12/1971  Juede .................. F16K 31/0655
                                                          137/883
(Continued)

OTHER PUBLICATIONS

International Search Report and Written Opinion for PCT/US2020/046203 dated Nov. 27, 2020.

*Primary Examiner* — Kevin F Murphy
(74) *Attorney, Agent, or Firm* — FIRM: MOSER TABOADA

(57) ABSTRACT

Embodiments of symmetric flow valves for use in a substrate processing chamber are provided herein. In some embodiments, a symmetric flow valve includes a valve body having sidewalls, a bottom plate, and a top plate that together define an interior volume, wherein the top plate includes one or more axisymmetrically disposed openings; a poppet disposed in the interior volume, wherein the poppet includes a central opening and a plurality of portions configured to selectively seal the one or more axisymmetrically disposed openings of the top plate when the symmetric flow valve is in a closed position; and a first actuator coupled to the poppet to position the poppet within the interior volume in at least an open position, where the poppet is spaced apart from the top plate to allow flow through the one or more axisymmetrically disposed openings of the top plate, and the closed position.

19 Claims, 6 Drawing Sheets

(51) Int. Cl.
*F16K 1/36* (2006.01)
*F16K 51/02* (2006.01)

(58) Field of Classification Search
CPC ..... Y10T 137/86718; Y10T 137/87877; C23C 16/4412
See application file for complete search history.

(56) References Cited

U.S. PATENT DOCUMENTS

| | | | |
|---|---|---|---|
| 3,853,268 A | 12/1974 | Schneider | |
| 4,175,591 A * | 11/1979 | Welker | B65G 53/30 137/262 |
| 4,856,558 A | 8/1989 | Kardos | |
| 6,189,519 B1 | 2/2001 | Press et al. | |
| 6,234,206 B1 | 5/2001 | Malmberg et al. | |
| 6,886,805 B2 * | 5/2005 | McCarty | F16B 7/0426 251/291 |
| 7,290,564 B2 | 11/2007 | Takahashi et al. | |
| 8,522,824 B2 * | 9/2013 | Feldmeier | F16K 31/1221 251/63.5 |
| 9,206,919 B2 * | 12/2015 | Neumeister | F16K 27/02 |
| 10,037,869 B2 * | 7/2018 | Brown | H01J 37/32449 |
| 2003/0159577 A1 | 8/2003 | Pfaff et al. | |
| 2007/0081893 A1 | 4/2007 | Huntley | |
| 2011/0100489 A1 | 5/2011 | Orito et al. | |
| 2012/0199475 A1 | 8/2012 | Mchugh et al. | |
| 2013/0203259 A1 | 8/2013 | Winniczek | |
| 2015/0047785 A1 * | 2/2015 | Kellogg | H01J 37/32834 156/345.1 |
| 2016/0215883 A1 | 7/2016 | Nguyen et al. | |
| 2017/0069466 A1 | 3/2017 | Tran et al. | |
| 2017/0356569 A1 | 12/2017 | Netzer et al. | |
| 2018/0073642 A1 | 3/2018 | Kajio | |
| 2018/0233327 A1 | 8/2018 | Kalnin et al. | |

* cited by examiner

SYMMETRIC FLOW VALVE FOR FLOW CONDUCTANCE CONTROL

CROSS-REFERENCE TO RELATED PATENT APPLICATIONS

This application is a continuation of and claims the benefit of U.S. patent application Ser. No. 16/542,798, filed Aug. 16, 2019, which is herein incorporated by reference in its entirety.

FIELD

Embodiments of the present disclosure generally relate to semiconductor processing equipment.

BACKGROUND

Substrate processing chambers generally are coupled to a vacuum system having a vacuum pump to exhaust the substrate processing chamber. However, the inventors have found existing flow valves in substrate processing chamber can cause choked flow, hindering flow conductance to a vacuum pump coupled to the substrate processing chamber.

Accordingly, the inventors have provided an improved flow valve to provide higher flow conductance.

SUMMARY

Embodiments of symmetric flow valves for use in a substrate processing chamber are provided herein. In some embodiments, a symmetric flow valve for use in a substrate processing chamber includes a valve body having sidewalls, a bottom plate, and a top plate that together define an interior volume, wherein the top plate includes one or more axisymmetrically disposed openings, and wherein the bottom plate includes an opening configured to interface with a pump port; a poppet disposed in the interior volume, wherein the poppet includes a central opening and a plurality of portions configured to selectively seal the one or more axisymmetrically disposed openings of the top plate when the symmetric flow valve is in a closed position; and a first actuator coupled to the poppet to position the poppet within the interior volume in at least an open position, where the poppet is spaced apart from the top plate to allow flow through the one or more axisymmetrically disposed openings of the top plate, and the closed position.

In some embodiments, a symmetric flow valve for use in a substrate processing chamber includes: a valve body having sidewalls, a bottom plate, and a top plate to define an interior volume, wherein the bottom plate includes an opening configured to interface with a pump port, and wherein the top plate includes three openings arranged asymmetrically about a center of the top plate; a poppet disposed in the interior volume and having a central opening, wherein the poppet includes three raised portions corresponding to the three openings of the top plate; and a plurality of actuators coupled to the poppet to raise or lower the poppet within the interior volume between an open position, where the poppet is spaced from the top plate to allow gas flow through the symmetric flow valve, and a closed position, where the three raised portions cover the three openings of the top plate to substantially prevent gas flow through the symmetric flow valve.

In some embodiments, a substrate processing chamber includes a chamber body; a symmetric flow valve comprising: a valve body having sidewalls, a bottom plate, and a top plate that together define an interior volume, wherein the top plate includes one or more axisymmetrically disposed openings, and wherein the bottom plate includes one or more openings configured to interface with a pump port, a poppet disposed in the interior volume and having a plurality of portions, and a plurality of actuators coupled to the poppet, wherein the plurality of actuators are configured to move the poppet between an open position, where the poppet is spaced from the top plate to allow gas flow through the symmetric flow valve, and a closed position, where the plurality of portions cover the one or more axisymmetrically disposed openings of the top plate to substantially prevent gas flow through the symmetric flow valve; and a pump coupled to each of the one or more openings of the bottom plate.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1A:
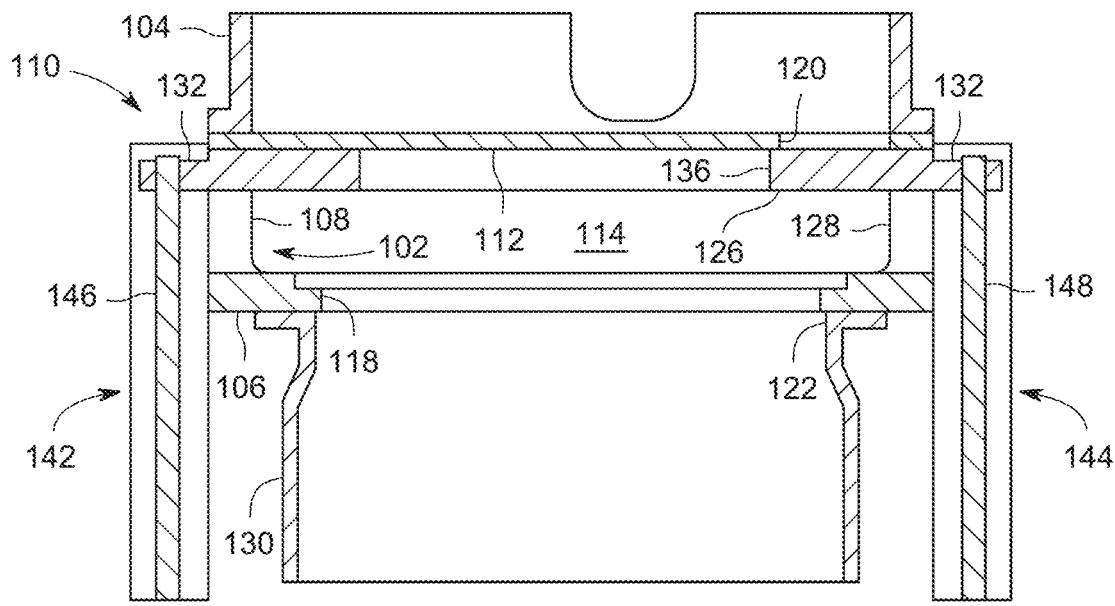
FIG. 1A depicts a cross sectional side view of a symmetric flow valve in a closed position in accordance with some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of a symmetric flow valve for use in a substrate processing chamber are provided herein. The symmetric flow valve is configured to reduce or prevent choked flow at an interface between a chamber body when a pump is evacuating an interior volume of the chamber body. The symmetric flow valve advantageously facilitates a bigger capacity pump installed on an existing substrate processing chamber with minimum or no change to the chamber body. In some embodiments, the symmetric flow valve may be installed on a substrate processing chamber initially configured to pump about 4000 to about 5000 liters per second through an existing flow valve, after which the substrate processing chamber can pump about 6500 to about 7500 liters per second through the symmetric flow valve.

FIG. 1A depicts a cross sectional side view of a symmetric flow valve 110 in a closed position in accordance with some embodiments of the present disclosure. In some embodiments, the symmetric flow valve 110 is disposed between a chamber body 104 and a pump 130. The symmetric flow valve 110 includes a valve body 102 having sidewalls 108, a bottom plate 106, and a top plate 112. The sidewalls 108, the bottom plate 106, and the top plate 112 together define an interior volume 114 of the valve body 102. In some embodiments, the valve body 102 has a width of about 25.0 inches to about 33.0 inches. In some embodiments, the valve body 102 has a height of about 5.0 inches to about 9.0 inches. The valve body can also have other dimensions scaled accordingly to interface with substrate processing chambers and pumps having different sizes.

In some embodiments, the top plate 112 includes one or more openings 120. In some embodiments, the one or more openings 120 are axisymmetrically disposed with respect to a central axis of an interior processing volume of the chamber body 104. In some embodiments, the one or more openings 120 are three openings (See FIG. 2). In some embodiments, the one or more openings 120 is one opening (See FIG. 4). In some embodiments, the top plate 112 is substantially the same size and geometry as the bottom plate 106. The top plate 112 may include openings to receive fasteners to couple the top plate 112 to the chamber body 104.

The bottom plate 106 includes an opening 118 configured to interface with a pump port 122. A poppet 126 is disposed in the interior volume 114 between the top plate 112 and the bottom plate 106. The poppet 126 includes a central opening 136. The poppet 126 may be made of aluminum, stainless steel, or any other suitable material. In some embodiments, the poppet 126 has a thickness of about 0.5 inches to about 2.5 inches. In some embodiments the central opening 136 is circular in shape. In some embodiments, the poppet 126 includes a plurality of wings 132 extending radially outward from the poppet 126. In some embodiments, the plurality of wings 132 is two wings diametrically opposed to each other about the poppet 126. In some embodiments, the plurality of wings 132 extend through corresponding openings 128 in the sidewalls 108 of the valve body 102. In some embodiments, the plurality of wings 132 are removeably coupled from the remainder of the poppet 126.

In some embodiments, each one of the plurality of wings 132 includes a coupling element to receive an actuator. For example, as shown in FIG. 1A, a first actuator 142 having a first shaft 146 is coupled to one of the plurality of wings 132 and a second actuator 144 having a second shaft 148 is coupled to another one of the plurality of wings 132. The first actuator 142 and the second actuator 144 are configured to position the poppet 126 in at least an open position and a closed position. The first actuator 142 and the second actuator 144 are configured to position the poppet within the interior volume 114 to advantageously control the flow conductance through the symmetric flow valve 110. In some embodiments, the first actuator 142 and the second actuator 144 are coupled to an outer surface of the sidewalls 108 of the valve body 102. In some embodiments, the first actuator 142 and the second actuator 144 are coupled to an upper surface of the top plate 112. In some embodiments, a stroke length of the first actuator 142 and the second actuator 144 is about 3.0 inches to about 4.0 inches.

Figure 1B:
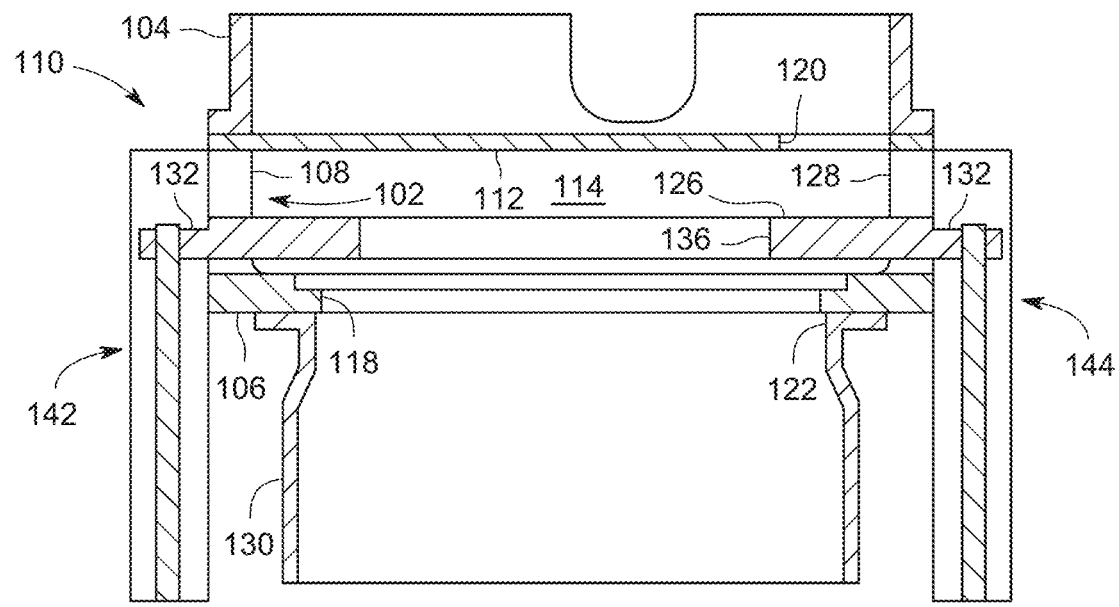
FIG. 1B depicts a cross sectional side view of a symmetric flow valve in an open position in accordance with some embodiments of the present disclosure.

In the closed position, as shown in FIG. 1A, the poppet 126 is disposed adjacent the top plate 112. The poppet 126 is configured to selectively seal the one or more openings 120 of the top plate 112 when the symmetric flow valve 110 is in the closed position. FIG. 1B depicts a cross sectional side view of a symmetric flow valve in an open position in accordance with some embodiments of the present disclosure. In the open position, the poppet 126 is spaced apart from the top plate 112 to allow flow through the one or more openings 120. In some embodiments the top plate 112 is removeably coupled to the remainder of the valve body 102 to advantageously provide easy installation and removal of the poppet 126.

Figure 2:
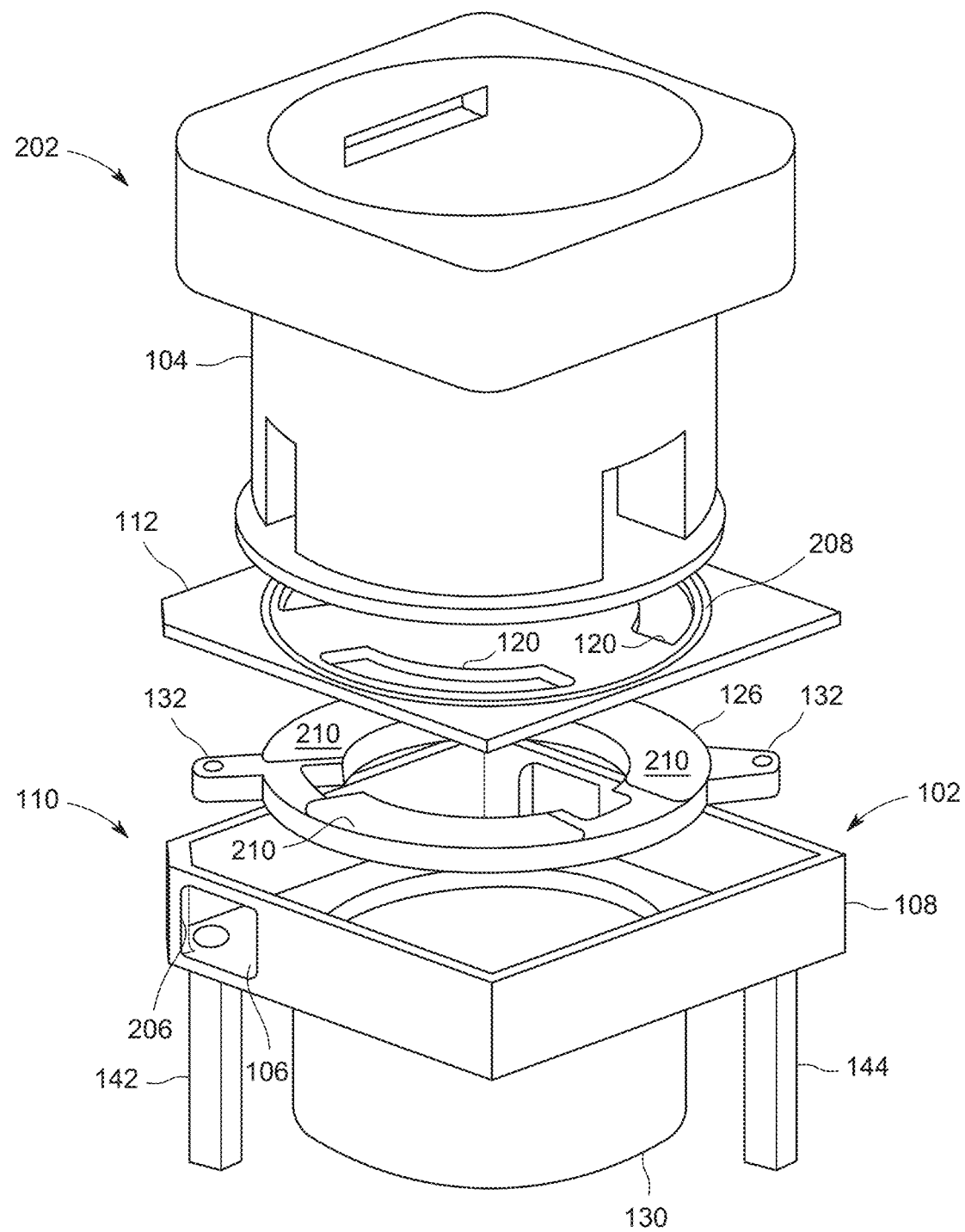
FIG. 2 depicts an exploded isometric view of a substrate processing chamber having a symmetric flow valve in accordance with some embodiments of the present disclosure.

FIG. 2 depicts an exploded isometric view of a substrate processing chamber 202 having a symmetric flow valve 110 in accordance with some embodiments of the present disclosure. The substrate processing chamber 202 is configured to process a substrate disposed therein. For example, the substrate processing chamber 202 may be an etching chamber, a physical vapor deposition chamber, or a chemical vapor deposition chamber. However, other types of substrate processing chambers configured for different processes can also use or be modified for use with embodiments of the symmetric flow valve 110 described herein. The substrate processing chamber 202 may be a stand-alone substrate processing chamber or part of a multi-chamber processing tool. In some embodiments, the valve body 102 has a substantially rectangular shape. In some embodiments, as shown in FIG. 2, the poppet 126 and the plurality of wings 132 are completely disposed within the valve body 102. In some embodiments, the first actuator 142 and the second actuator 144 are coupled to a bottom surface of the bottom plate 106.

In some embodiments, the sidewalls 108 of the valve body 102 include one or more service doors 206 to service components within the interior volume 114. In some embodiments, the top plate 112 includes an o-ring groove 208 to accommodate an o-ring to provide a seal when the top plate 112 is coupled to the chamber body 104. The poppet includes a plurality of portions 210 configured to selectively seal the one or more openings 120 of the top plate 112 when the symmetric flow valve 110 is in the closed position.

Figure 3:
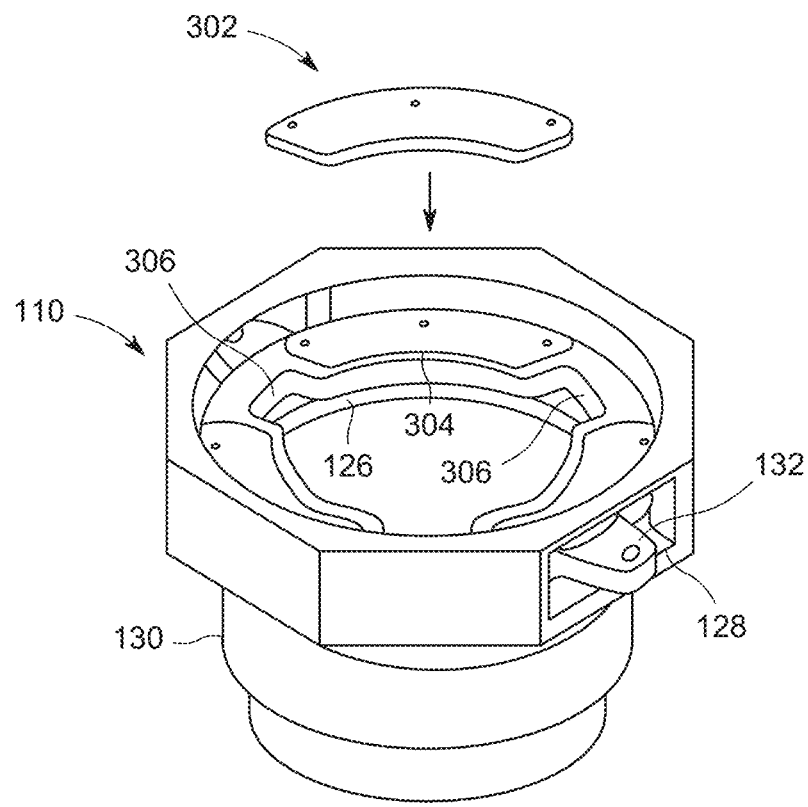
FIG. 3 depicts an exploded isometric view of a symmetric flow valve in accordance with some embodiments of the present disclosure.

FIG. 3 depicts an exploded isometric view of a symmetric flow valve in accordance with some embodiments of the present disclosure. In some embodiments, the valve body 102 has an octagon shape. In some embodiments, the poppet 126 includes a plurality of cover plates 302 coupled to corresponding ones of the plurality of portions 210. The plurality of cover plates 302 may be advantageously replaced without having to replace the entire poppet 126. In some embodiments, the plurality of cover plates 302 may be raised with respect to a top surface 304 of the poppet 126. In some embodiments, the poppet 126 includes one or more recesses 306 extending radially outward from the central opening. The one or more recesses 306 are configured to reduce a weight of the poppet 126 and provide a larger opening for flow conductance.

Figure 4:
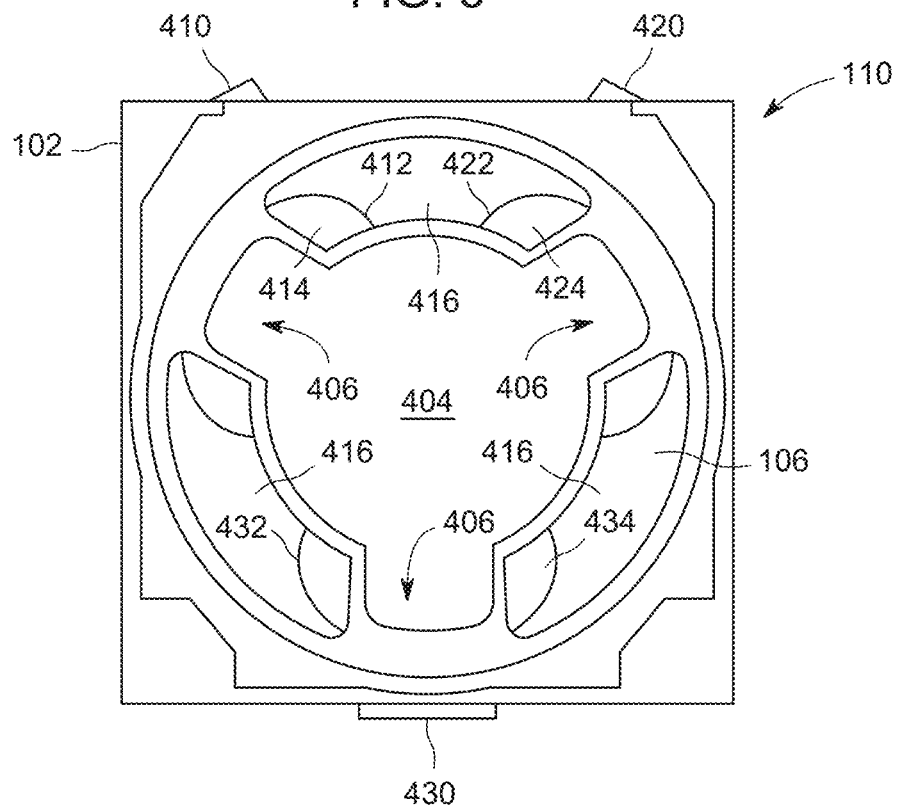
FIG. 4 depicts a top view of a symmetric flow valve in accordance with some embodiments of the present disclosure.

FIG. 4 depicts a top view of a symmetric flow valve in accordance with some embodiments of the present disclosure. In some embodiments, the chamber body 104 includes a floor 404 having a plurality of spokes 406 extending radially outward to define a plurality of axisymmetric chamber ports 416 therebetween. In some embodiments the plurality of axisymmetric chamber ports 416 includes three ports. In some embodiments, the symmetric flow valve 110 is coupled to three smaller pumps that are configured to provide a flow conductance similar to the pump 130 that is larger. In some embodiments, the bottom plate 106 includes a first circular opening 412, a second circular opening 422, and a third circular opening 432 disposed axisymmetrically.

A first poppet 414, a second poppet 424, and a third poppet 434 are disposed in the valve body 102 and are configured to selectively seal the first circular opening 412, the second circular opening 422, and the third circular opening 432, respectively, when the symmetric flow valve 110 is in a closed position. In some embodiments, the first poppet 414, the second poppet 424, and the third poppet 434 are coupled to a first actuator 410, a second actuator 420, and a third actuator 430, respectively, to selectively raise or lower the first poppet 414, the second poppet 424, and the third poppet 434 between at least the closed position and an open position. In the open position, the first poppet 414, the second poppet 424, and the third poppet 434 are raised with respect to the bottom plate 106.

In some embodiments, the first circular opening 412, the second circular opening 422, and the third circular opening 432 are disposed directly below the plurality of spokes 406 to provide increased pumping efficiency. In some embodiments, the first circular opening 412, the second circular opening 422, and the third circular opening 432 are disposed between adjacent spokes 406 so that the three smaller pumps are in line with the axisymmetric chamber ports 416 to provide more uniform flow conductance.

Figure 5:
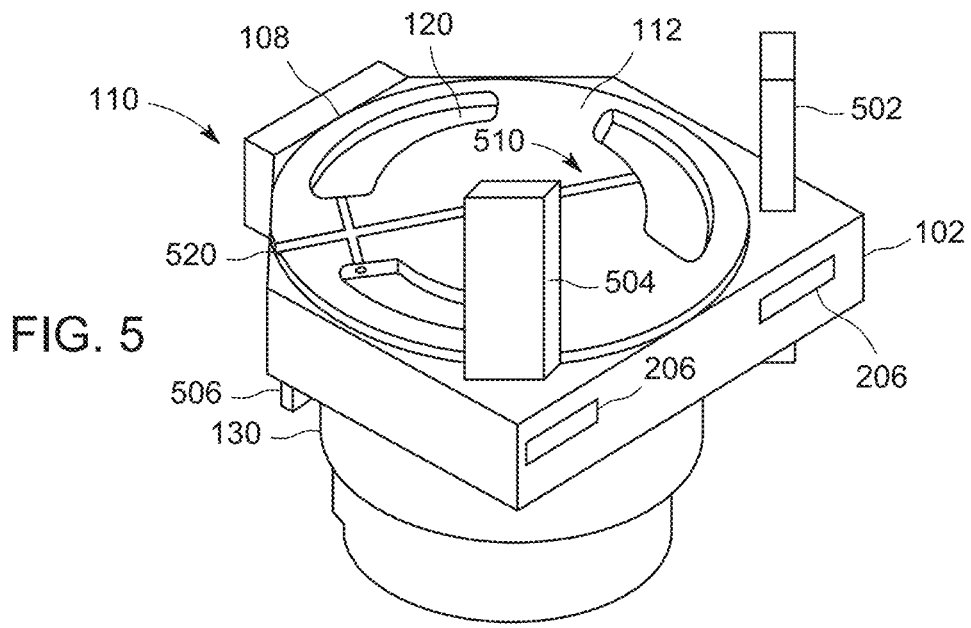
FIG. 5 depicts a schematic isometric view of a symmetric flow valve in accordance with some embodiments of the present disclosure.

FIG. 5 depicts a schematic isometric view of a symmetric flow valve in accordance with some embodiments of the present disclosure. In some embodiments, the valve body 102 has a hexagon shape. In some embodiments, as shown in FIG. 5, the symmetric flow valve 110 includes a first actuator 502, a second actuator 504, and a third actuator 506 disposed about the top plate 112. In some embodiments, each of the actuators are mounted to a same side of the valve body 102. In some embodiments, at least one of the actuators is mounted to a different side of the valve body 102. For example, as depicted in FIG. 5, in some embodiments, the first actuator 502 and the second actuator 504 are coupled to an upper surface of the top plate 112. In some embodiments, the valve body 102 includes a service door 206 adjacent each of the first actuator 502 and the second actuator 504 to facilitate poppet service. In some embodiments, the third actuator 506 is coupled to at least one of the sidewall 108 and the bottom plate 106 of the valve body 102 and extends in a direction opposite the first actuator 502 and the second actuator 504 to advantageously provide easy servicing to the symmetric flow valve 110 and to reduce interference with bottom components. Three actuators 502, 504, 506, advantageously reduce a deflection of the poppet 126.

In some embodiments, a rough pump port 520 is disposed in the top plate 112. In some embodiments, rough pump channels 510 extend between each opening of the one or more openings 120 of the top plate 112 and are fluidly coupled to the rough pump port 520. In some embodiments, the rough pump channels 510 are embedded within the top plate 112. In some embodiments, the rough pump channels 510 are trenches that extend from an upper surface of the top plate 112 into the top plate 112. The rough pump port 520 is configured to provide rough pumping of the substrate processing chamber 202 when the symmetric flow valve 110 is in a closed position and prior to high vacuum pumping by the pump 130. In some embodiments, the rough pump channels 510 create a cross or "plus" shape with a center of the cross or "plus" shape disposed between all of the openings of the one or more openings 120. In some embodiments, the rough pump channels 510 create a cross or "plus" shape with a center of the cross or "plus" shape disposed proximate a periphery of the top plate 112 between adjacent openings of the one or more openings 120. In some embodiments, the rough pump channels 510 have a diameter of about 0.3 inches to about 0.7 inches.

Figure 6A:
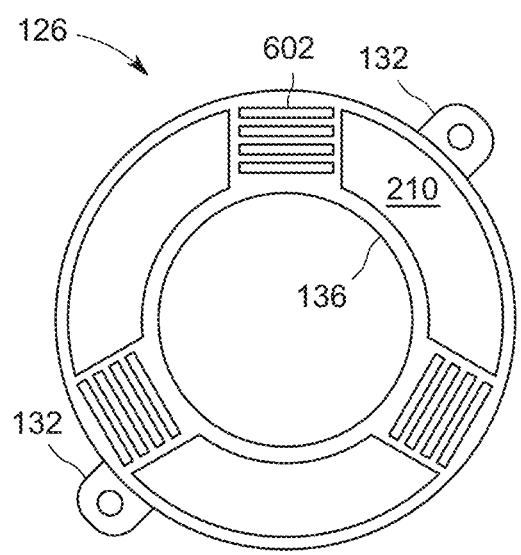
FIG. 6A depicts a top view of a poppet in accordance with some embodiments of the present disclosure.

FIG. 6A depicts a top view of a poppet in accordance with some embodiments of the present disclosure. In some embodiments, the poppet 126 includes one or more slots 602 disposed between adjacent portions 210 of the plurality of portions 210. The one or more slots 602 advantageously improve flow conductance through the poppet 126 and further reduce a weight of the poppet 126. In some embodiments, the one or more slots 602 include four slots.

Figure 6B:
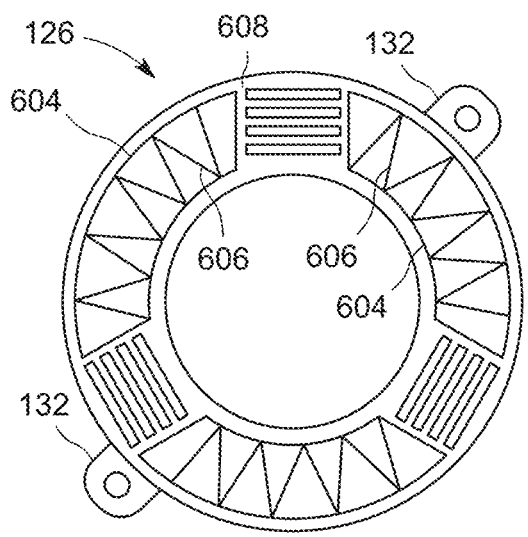
FIG. 6B depicts a bottom view of the poppet of FIG. 6A.

FIG. 6B depicts a bottom view of the poppet of FIG. 6A. In some embodiments, the poppet 126 includes cutouts 604 on a bottom surface 608 of the poppet 126 positioned directly below the plurality of portions 210. The cutouts 604 advantageously reduce the weight of the poppet 126. In some embodiments, the poppet 126 includes ribs 606 disposed within the cutouts 604 to increase stiffness of the poppet 126. The ribs 606 can be provided in any geometric pattern desired to increase the stiffness of the poppet, such as for example, a zig-zag pattern (as depicted in FIG. 6B), a radial pattern, a honeycomb pattern, or the like. While two wings 132 of the plurality of wings 132 are shown in the poppets 126 of FIGS. 6A and 6A, the poppet 126 may include three or four wings 132 when used with embodiments of the symmetric flow valve 110 having three or four actuators, respectively.

Figure 7A:
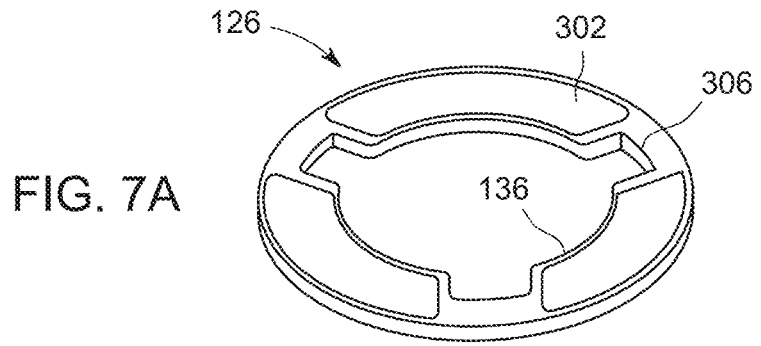
FIG. 7A depicts a top isometric view of a poppet in accordance with some embodiments of the present disclosure.
Figure 7B:
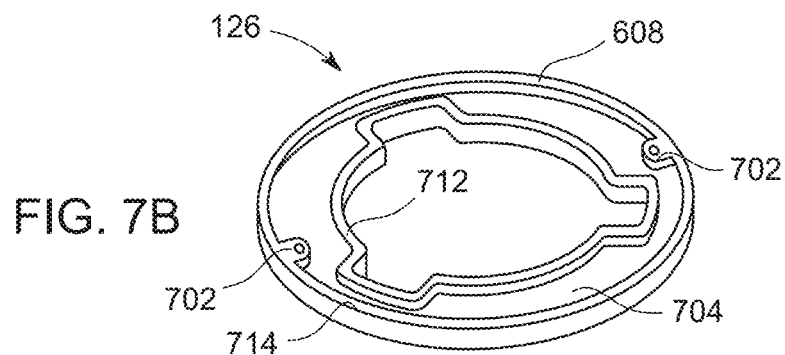
FIG. 7B depicts a bottom isometric view of the poppet of FIG. 7A.

FIGS. 7A and 7B depict a top isometric view and a bottom isometric view, respectively, of a poppet in accordance with some embodiments of the present disclosure. In some embodiments, the poppet 126 includes three recesses 306 extending radially outward form the central opening 136. In some embodiments, the bottom surface 608 of the poppet 126 includes an annular cutout 704. In some embodiments, the annular cutout 704 extends between a first sidewall 712 defined by the central opening 136 and the three recesses 306 and a second sidewall 714 defined by an outer surface of the poppet 126. The annular cutout 704 advantageously reduces a weight of the poppet 126. In some embodiments, the poppet 126 includes one or more coupling elements 702 extending radially inward from the second sidewall 714 to accommodate coupling with two or more actuators of the symmetric flow valve 110 (e.g., actuators 142, 144, 502, 504, 506). In some embodiments, the one or more coupling elements 702 are coupled to one or more actuators (e.g., actuators 142, 144, 502, 504, 506). disposed on the top plate 112 of the valve body 102.

Figure 8A:
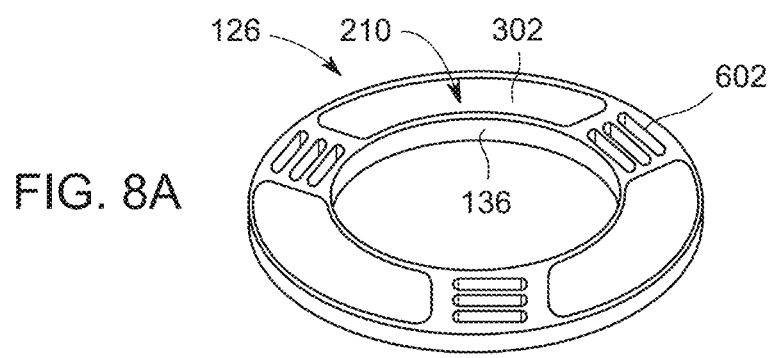
FIG. 8A depicts a top isometric view of a poppet in accordance with some embodiments of the present disclosure.
Figure 8B:
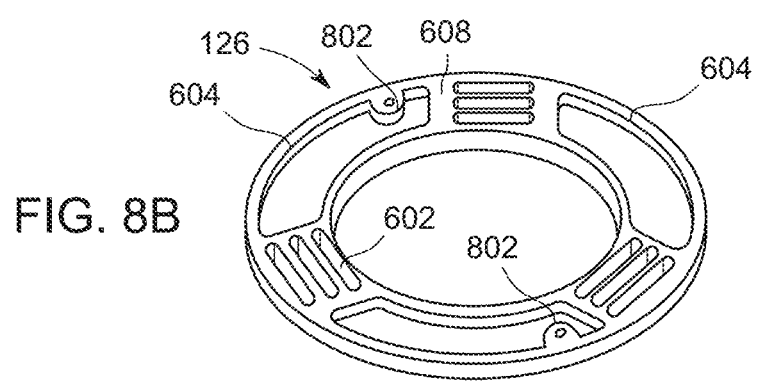
FIG. 8B depicts a bottom isometric view of the poppet of FIG. 8A.

FIGS. 8A and 8B depict a top isometric view and a bottom isometric view, respectively, of a poppet in accordance with some embodiments of the present disclosure. In some embodiments, the poppet 126 includes three slots 602 disposed between adjacent portions 210 of the plurality of portions 210. In some embodiments, the bottom surface 608 of the poppet 126 includes cutouts 604 positioned directly below the plurality of portions 210. In some embodiments, at least two of the cutouts 604 include a coupling element 802 extending radially inward from a sidewall of the cutout 604 to accommodate coupling with two or more actuators of the symmetric flow valve 110 (e.g., actuators 142, 144, 502, 504, 506).

Figure 9:
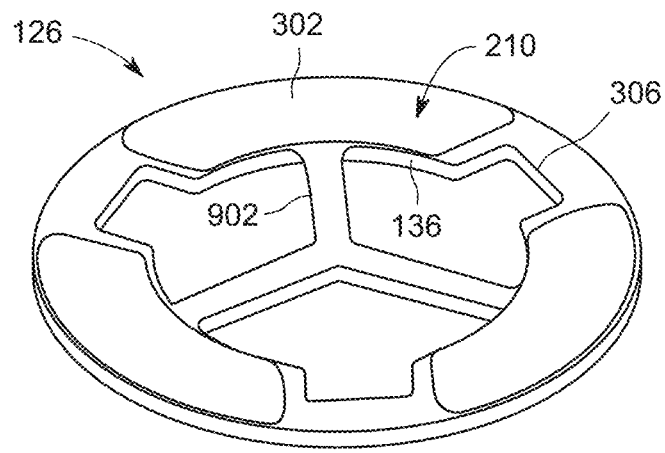
FIG. 9 depicts a top isometric view of a poppet in accordance with some embodiments of the present disclosure.

FIG. 9 depicts a top isometric view of a poppet in accordance with some embodiments of the present disclosure. In some embodiments, the poppet 126 includes a plurality of spokes 902 extending from a center of the poppet 126 to the central opening 136. The plurality of spokes 902 advantageously provide additional structural support to the poppet 126. In some embodiments, the plurality of spokes 902 comprises three spokes. In some embodiments, the poppets 126 of FIG. 7A through FIG. 9 include the plurality of wings 132. In some embodiments, any of the poppets 126 disclosed herein include a combination of one or more wings 132 and one or more coupling elements 702, 802.

Figure 10:
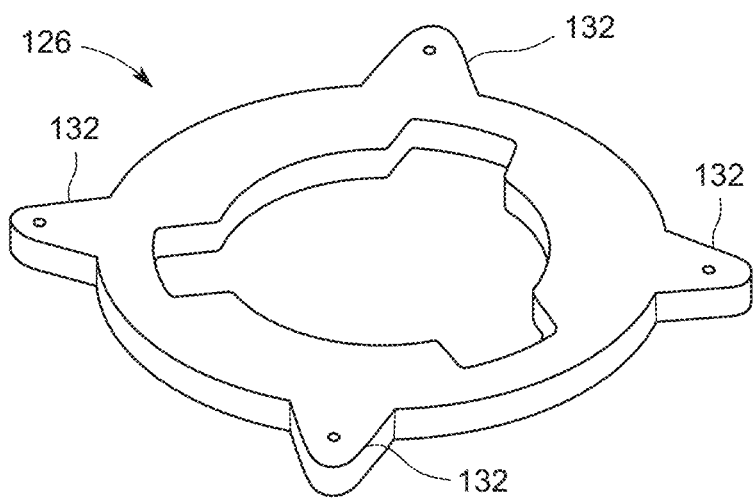
FIG. 10 depicts a top isometric view of a poppet in accordance with some embodiments of the present disclosure.

FIG. 10 depicts a top isometric view of a poppet in accordance with some embodiments of the present disclosure. In some embodiments, the plurality of wings 132 of the poppet 126 includes four wings 132. In some embodiments, the symmetric flow valve 110 includes four actuators configured to couple with the four wings 132. Symmetric flow valves 110 having four actuators advantageously provides additional support to the poppet 126 and reduces deformation of the poppet 126. In some embodiments, the four actuators may be placed on an upper surface of the top plate 112. In some embodiments, the four actuators may be coupled to at least one of the sidewalls 108 and the bottom plate 106.

While the foregoing is directed to embodiments of the present disclosure, other and further embodiments of the disclosure may be devised without departing from the basic scope thereof.

The invention claimed is:

1. A symmetric flow valve for use in a substrate processing chamber, comprising:
 a valve body having sidewalls, a bottom plate, and a top plate that together define an interior volume, wherein the valve body includes a plurality of axisymmetrically disposed openings comprising three or more openings arranged in a non-linear manner, wherein a first opening of the plurality of axisymmetrically disposed openings is configured to interface with a pump port, wherein the top plate includes an opening, and wherein all of the plurality of axisymmetrically disposed openings are disposed radially inward of an outer diameter of the opening of the top plate;
 a first poppet coupled to a first actuator to move the first poppet between at least a closed position and an open position to selectively seal the first opening; and
 a second poppet coupled to a second actuator to move the second poppet between at least a closed position and an open position to selectively seal a second opening of the plurality of axisymmetrically disposed openings.

2. The symmetric flow valve of claim 1, further comprising a third poppet coupled to a third actuator to move the third poppet between at least a closed position and an open position to selectively seal a third opening of the plurality of axisymmetrically disposed openings.

3. The symmetric flow valve of claim 1, wherein the second opening is configured to interface with a second pump port.

4. The symmetric flow valve of claim 1, wherein at least one of:
 the valve body includes a service door on one or more sidewalls to facilitate poppet service, or
 wherein the valve body has a rectangular, hexagon, or octagon shape.

5. The symmetric flow valve of claim 1, wherein the first actuator is coupled to the bottom plate of the valve body or the top plate of the valve body.

6. The symmetric flow valve of claim 1, wherein the first poppet includes one or more cutouts extending from a bottom surface of the first poppet towards an upper surface of the first poppet.

7. The symmetric flow valve of claim 1, wherein the pump port is disposed in the bottom plate.

8. The symmetric flow valve of claim 1, wherein the first opening is coupled to a first pump and the second opening is coupled to a second pump different than the first pump.

9. A symmetric flow valve for use in a substrate processing chamber, comprising:
 A valve body having sidewalls, a bottom plate, and a top plate that together define an interior volume, wherein the valve body includes a plurality of axisymmetrically disposed openings arranged about an axis that is perpendicular to the bottom plate, wherein an angle between respective centers of the plurality of axisymmetrically disposed openings with respect to the axis is less than 180 degrees, wherein the valve body defines a flow path extending into the interior volume through the top plate and out of the interior volume through the plurality of axisymmetrically disposed openings, and wherein each of the plurality of axisymmetrically disposed openings are configured to interface with a pump port, wherein the top plate includes an opening, and wherein all of the plurality of axisymmetrically disposed openings are disposed radially inward of an outer diameter of the opening of the top plate; and
 a plurality of poppets configured to selectively seal corresponding ones of the plurality of axisymmetrically disposed openings by selectively moving between at least a closed position and an open position.

10. The symmetric flow valve of claim 9, wherein the plurality of axisymmetrically disposed openings comprise three openings disposed in the bottom plate.

11. The symmetric flow valve of claim 9, wherein the plurality of poppets are made of aluminum or stainless steel.

12. The symmetric flow valve of claim 9, further comprising a plurality of actuators coupled to respective ones of the plurality of poppets to move the plurality of poppets between the open position and the closed position.

13. The symmetric flow valve of claim 12, wherein at least one of the plurality of actuators is coupled to a sidewall of the valve body.

14. The symmetric flow valve of claim 9, wherein the pump port is a common pump port for the plurality of axisymmetrically disposed openings disposed vertically below the plurality of axisymmetrically disposed openings.

15. A substrate processing chamber, comprising:
 a chamber body having a floor, wherein the floor includes a plurality of arc shaped openings;

a symmetric flow valve comprising:
  a valve body having sidewalls, a bottom plate, and a top plate that together define an interior volume, wherein the valve body includes a plurality of axisymmetrically disposed openings arranged about and equidistant to an axis passing perpendicular to the top plate and the bottom plate, and wherein each of the plurality of axisymmetrically disposed openings are configured to interface with a pump port; and
  a plurality of poppets configured to selectively seal corresponding ones of the plurality of the axisymmetrically disposed openings by selectively moving between at least a closed position and an open position via a plurality of actuators; and
 one or more pumps coupled to the plurality of axisymmetrically disposed openings.

16. The substrate processing chamber of claim 15, wherein the plurality of axisymmetrically disposed openings are radially outward of a center of the bottom plate.

17. The substrate processing chamber of claim 15, wherein the substrate processing chamber is configured to pump about 6500 to about 7500 liters per second through the symmetric flow valve.

18. The substrate processing chamber of claim 15, wherein the plurality of actuators are coupled to the bottom plate of the valve body or the top plate of the valve body.

19. The substrate processing chamber of claim 15, wherein the plurality of actuators have a stroke length of about 3.0 inches to about 4.0 inches.

* * * * *